(12) United States Patent
David et al.

(10) Patent No.: US 10,375,092 B2
(45) Date of Patent: Aug. 6, 2019

(54) CENTRALIZED CONTROLLER MANAGEMENT AND ANOMALY DETECTION

(71) Applicant: Karamba Security, Hod Hasharon (IL)

(72) Inventors: Tal Efraim Ben David, Hogla (IL); Assaf Harel, Ramat Hasharon (IL); Amiram Dotan, Birmingham, MI (US); David Barzilai, Hod Hasharon (IL)

(73) Assignee: KARAMBA SECURITY LTD., Hod Hasharon (IL)

( * ) Notice: Subject to any disclaimer, the term of this patent is extended or adjusted under 35 U.S.C. 154(b) by 0 days.

(21) Appl. No.: 16/012,139

(22) Filed: Jun. 19, 2018

(65) Prior Publication Data
US 2018/0316698 A1    Nov. 1, 2018

Related U.S. Application Data

(63) Continuation of application No. PCT/IB2017/051967, filed on Apr. 5, 2017.
(Continued)

(51) Int. Cl.
*H04L 29/06* (2006.01)
*H04L 12/26* (2006.01)
(Continued)

(52) U.S. Cl.
CPC ......... *H04L 63/1416* (2013.01); *G06F 21/51* (2013.01); *H04L 12/40* (2013.01);
(Continued)

(58) Field of Classification Search
CPC . H04L 63/0227; H04L 63/14; H04L 63/1408; H04L 63/1416; H04L 63/1441;
(Continued)

(56) References Cited

U.S. PATENT DOCUMENTS

| 8,090,816 B1 | 1/2012 | Deshmukh |
| 8,555,385 B1 | 10/2013 | Bhatkar et al. |

(Continued)

FOREIGN PATENT DOCUMENTS

| EP | 2892199 | 7/2015 |
| WO | WO 2013/063474 | 5/2013 |
| WO | WO 2016/046819 | 3/2016 |

OTHER PUBLICATIONS

International Search Report and Written Opinion in International Application No. PCT/IB2017/051964, dated Jun. 26, 2017, 19 pages.
(Continued)

*Primary Examiner* — Ali S Abyaneh
*Assistant Examiner* — Alexander R Lapian
(74) *Attorney, Agent, or Firm* — Finnegan, Henderson, Farabow, Garrett & Dunner, LLP

(57) ABSTRACT

In one implementation, a method for providing security on externally connected controllers includes receiving, at a server system, operation information for a plurality of instances of a controller, the plurality of instances being installed across a plurality of devices; statistically analyzing, by the server system, the operation information; identifying, by the server system, one or more anomalous controller behaviors based on the statistical analysis; and providing, by the server system, information regarding the one or more anomalous controller behaviors on the controller as potential security threats.

25 Claims, 7 Drawing Sheets

Related U.S. Application Data

(60) Provisional application No. 62/346,895, filed on Jun. 7, 2016, provisional application No. 62/319,178, filed on Apr. 6, 2016.

(51) Int. Cl.
*G06F 21/51* (2013.01)
*H04L 12/40* (2006.01)
*H04W 12/12* (2009.01)

(52) U.S. Cl.
CPC .......... *H04L 43/06* (2013.01); *H04L 63/0236* (2013.01); *H04L 63/145* (2013.01); *H04L 63/1425* (2013.01); *H04L 63/1441* (2013.01); *H04W 12/1208* (2019.01); *H04L 2012/40215* (2013.01); *H04L 2209/84* (2013.01)

(58) Field of Classification Search
CPC . H04L 63/1425; H04L 67/12; H04L 12/4625; G06F 21/55; G06F 21/554; G06F 21/606; G06F 21/6281; G06F 11/30; B60R 25/00; B60R 16/023
See application file for complete search history.

(56) References Cited

U.S. PATENT DOCUMENTS

| | | | |
|---|---|---|---|
| 9,992,214 B1* | 6/2018 | Xiao | H04L 63/1416 |
| 2008/0168558 A1* | 7/2008 | Kratzer | G06F 21/55 |
| | | | 726/23 |
| 2009/0320136 A1* | 12/2009 | Lambert | G06F 21/554 |
| | | | 726/25 |
| 2010/0190439 A1* | 7/2010 | Huang | H04L 67/12 |
| | | | 455/41.2 |
| 2010/0251328 A1 | 9/2010 | Syed et al. | |
| 2011/0083186 A1 | 4/2011 | Niemela | |
| 2013/0086625 A1 | 4/2013 | Driscoll et al. | |
| 2013/0097660 A1* | 4/2013 | Das | H04L 63/10 |
| | | | 726/1 |
| 2013/0097708 A1 | 4/2013 | Jayanthi et al. | |
| 2013/0111547 A1* | 5/2013 | Kraemer | G06F 21/552 |
| | | | 726/1 |
| 2014/0136710 A1 | 5/2014 | Benari et al. | |
| 2015/0150124 A1 | 5/2015 | Zhang et al. | |
| 2015/0195297 A1* | 7/2015 | Ben Noon | B60R 16/023 |
| | | | 726/22 |
| 2018/0247045 A1* | 8/2018 | David | G06F 21/44 |
| 2018/0295147 A1* | 10/2018 | Haga | H04L 63/1425 |

OTHER PUBLICATIONS

International Search Report and Written Opinion in International Application No. PCT/IB2017/051965, dated Aug. 18, 2017, 20 pages.
International Search Report and Written Opinion in International Application No. PCT/IB2017/051967, dated Jun. 12, 2017, 17 pages.
Anonymous, "Method for protecting code from running in unlicensed environinents", ip.com Journal, Jun. 17, 2014, 1-2.
International Search Report and Written Opinion in International Application No. PCT/IB2017/05195S, dated Jun. 19, 2017, 22 pages.

\* cited by examiner

CENTRALIZED CONTROLLER MANAGEMENT AND ANOMALY DETECTION

CROSS-REFERENCE TO RELATED APPLICATION

This application is a continuation of PCT Application No. PCT/IB2017/051967 filed Apr. 5, 2017, which claims priority to U.S. application Ser. No. 62/319,178, filed on Apr. 6, 2016, and U.S. application Ser. No. 62/346,895, filed Jun. 7, 2016, the disclosures of which are incorporated herein by reference.

TECHNICAL FIELD

This specification generally relates to security for computer-based controllers, such as controllers for Internet of Things (IoT) devices.

BACKGROUND

More devices are becoming "smarter" with hardware and software that permit them to communicate via the internet, such as through cellular wireless networks, Wi-Fi, and Bluetooth. These internet-connected devices are often identified as being part of the "Internet of Things" (IoT), which is a term that broadly encompasses internet-connected devices configured to transmit and receive information related to their operation, such as status information. For example, many consumer products are now IoT devices with internet-connected features, such as home automation devices (e.g., wirelessly controllable light switches), appliances (e.g., smart refrigerators able to transmit images of the fridge's contents), and automobiles (e.g., internet-connected components, such as infotainment and navigation devices). For instance, modern vehicles can have over 100 controllers, or Electronic Control Units (ECUs), that are responsible for running most of the car's functions, such as the steering wheel, engine, braking system, airbags, and navigation systems.

Like any other externally connected computers, IoT devices (e.g., ECUs in connected cars) are vulnerable to cyber attack and have become targets for hackers. For example, controllers on several makes and models of cars, such as the JEEP CHEROKEE, TOYOTA PRIUS, TESLA MODEL S, and NISSAN LEAF, have been successfully targeted and exploited by white hat hackers. Those hackers were able to compromise the vehicles and take command of nearly all of the control aspects, ranging from turning on the radio and windshield wipers to killing the engine while the car drove on the freeway. These exploits caused some of these car manufacturers to issue a recall on affected vehicles.

Cyber attacks come in many forms and flavors, but they generally share the same basic concepts: find a preexisting security bug (vulnerability) in the system's software, exploit it, and run malware. A common security bugs is neglecting to verify the size of input buffers, which hackers can exploit by passing long buffers that get out of the boundaries allocated for that buffer on the software stack. By getting out of the buffer boundaries, hackers may be able to access and change the pointer structure that controls the functional flow of code, which hackers can use to direct the controller to execute malware code. Although malware code can vary (e.g., keylogger, ransomware, e-mail spam), the exploitation mechanism is often similar—find a security bug, research and learn how to exploit it in order to gain control, and use the control to run the malware code.

SUMMARY

This document generally describes a technological solution that hardens externally connected controllers (e.g., ECUs) within an IoT device (e.g., connected automobile) against hackers. Customized security policies for controllers can be automatically generated and added to controllers with security layers without having to modify the underlying controller software. Such security policies and layers be implemented on controllers to ensure that only valid code and valid behaviors are allowed to run on the controllers, which can maintain secure operation and prevent the attacks from ever infiltrating the IoT device's infrastructure, such as a car's Controller Area Network (CAN Bus).

By focusing on hardening the controllers within IoT devices/systems that are open to external access (via the Internet, WiFi, Bluetooth, etc.)—meaning restricting the operations and behavior of the controllers to a set of expected operations and behaviors—the controllers can be transformed from potential security vulnerabilities into gates that prevent and block hacker attempts to get into the controller's internal infrastructure, essentially stopping hacker attacks on IoT devices. Endpoint security layers can stop attacks on controller by blocking hackers at the gate—meaning an externally facing entry point into a device and/or system, such as at externally facing ECUs in an automobile that, if compromised, could provide access to the CAN Bus. As a result, attacks cannot make it inside of an IoT device/system, which can prevent access to and control of an IoT device/system's functions.

This document describes four general aspects. First, automatic security policy generation which includes automatically generating custom security policies that can be implemented on controllers without manual design. Second, secure controller operation and malware prevention using custom security policies that have been incorporated into controllers. Third, securely logging and reporting information on controller operation, such as the current status of a controller and blocked malware attempts, back to a central management computer system in real time without affecting controller performance/operation. Fourth, providing a centralized computer system to aggregate information from multiple devices using the same controllers, to provide for global device/controller views and analytics, including identifying and detecting anomalous controller operation.

While this document describes all four of these aspects, this document focuses the fourth aspect—a centralized computer system to aggregate information from multiple devices using the same controllers, to provide for global device/controller views and analytics, including identifying and detecting anomalous controller operation.

In one implementation, a method for providing security on externally connected controllers includes receiving, at a server system, operation information for a plurality of instances of a controller, the plurality of instances being installed across a plurality of devices; statistically analyzing, by the server system, the operation information; identifying, by the server system, one or more anomalous controller behaviors based on the statistical analysis; and providing, by the server system, information regarding the one or more anomalous controller behaviors on the controller as potential security threats.

Such a method can optionally include one or more of the following features, which can be combined in each possible sub-combination of features. The method can further include updating, by the server system, one or more security policies to exclude performance of the one or more anomalous controller behaviors in response to the information; and pushing out the updated one or more security policies to the plurality of devices. The plurality of instances of the controller can block the one or more anomalous controller behaviors from being performed on the controller using the updated one or more security policies. The plurality of instances of the controller can include a security middleware layer that is incorporated into operating systems on the plurality of instances of the controller. The security middleware layer can be positioned to restrict one or more kernel processes of the operating system to operations that are permitted according to the updated one or more security policies. Updating the one or more security policies can include removing information corresponding to the one or more anomalous controller behaviors from one or more whitelists that are part of the one or more security policies. The one or more whitelists can define the operations that are permitted. The one or more anomalous controller behaviors can include a particular sequence of function calls. The information removed from the one or more whitelists can include function mappings outlining the particular sequence of function calls. The one or more anomalous controller behaviors can include receipt or transmission of a particular network packet. The information removed from the one or more whitelists can include one or more of: an IP address specified in the particular network packet, a network port specified in the particular network packet, and a payload content type for the particular network packet. The one or more anomalous controller behaviors can include execution of a particular process. The information removed from the one or more whitelists can include information identifying the particular process. The controller can be an automotive controller and the device is a vehicle. The operation information can include malware reports that identify malware blocked on the plurality of instances of the controller, the malware reports including copies of the blocked malware.

In another implementation, a method for providing security on externally connected controllers can include receiving, at a server system, real-time information identifying malware blocked by a security middleware layer running on a controller that is part of a device; aggregating, by the server system, the real-time information with real-time information from other controllers; determining, by the server system, aggregate information related to the blocked malware on the controller; generating, by the server system, a report that includes information identifying the blocked malware on the controller and the aggregate information; and transmitting, by the server system and in real-time, the report to a client computing device for a user who is associated with the controller.

Such a method can optionally include one or more of the following features, which can be combined in each possible sub-combination of features. The real-time information can include a malware report that identify the blocked malware, a portion of an operating system on the controlled that was exploited by the blocked malware, and a copy of the blocked malware. The report can include information identifying the blocked malware, the exploited portion of the operating system, and the copy of the blocked malware. The aggregate information can include information regarding a current status of other instances of the controller running on other devices. The aggregate information can include information regarding other instances of the malware being blocked on other controllers. The controller can be an automotive controller and the device is a vehicle.

Certain implementations can provide one or more of the following advantages. For example, endpoint controller security can us an operating system (OS) agnostic security agent and is built with an OS-specific middleware and a general purpose security agent. Such a security agent can be deployed in externally connected controllers to perform a variety of security-related functions, such as enforcing automatically generated security policies, collecting forensics information and upload it to the cloud, and/or providing anti-tampering features to prohibit hackers from circumventing the security agents. Such OS-agnostic agents can allow for endpoint security to be readily configured and deployed across a wide variety of vehicle controllers and OS environments.

In another example, the system can be integrated with the OEM/manufacturer build environment for controllers to automatically generate security agents and policies that are specific to the controllers, which can then be deployed to harden controllers and prevent security breaches. For instance, a client (or other software application/module) integrated into a build environment for a controller can scan the code and the binary for the controller, and automatically generate a security policy that is specific to the controller. Such scanning and automatic generation can include, for example, using static analysis tools and techniques to identify the universe of permitted processes, binaries, scripts, network usage, and/or other controller behaviors that are used to generate a customized security policy for the controller. Such as security policy can include, for example, a whitelist (e.g., identification of permitted processes, binaries, functions, operations), network firewall (e.g., identification of permitted network ports, IP addresses), functional graph (e.g., mapping and/or sequence of functions performed by a controller), and/or additional features that model permitted/designed behavior of the controller. Such automatic security policy generation (e.g., during build, due to static analysis (and other tools, such as simply signing on binaries to add to a whitelist)) can permit for endpoint security to be added to controllers with little to no effort on behalf of controller manufacturers/vendors, who can simply run the automated security policy generator prior to deployment in order to add endpoint security to their controller.

In a further example, a server system (e.g., cloud-base system) can be used to manage and monitor controllers that are hardened with endpoint security. Such as server system can processes and generate reports regarding controllers, such as information on detected and blocked malware, the current state of controllers in a vehicle, and/or other relevant information. Such reports can be at any of a variety of levels of granularity, from vehicle-specific views to manufacturer-specific views to the industry-wide views, which can be based on aggregated and anonymized user/vehicle/manufacturer information. For instance, a server system can collect forensics information in order to display incident reports based on malware detection, to calculate anomaly detection, to display current state of cars on the roads, to provide a management console in order to enhance policies (in production and during build—i.e. the cloud system is also connected to the project while it's being developed), and/or other relevant features. Such features can allow for manufacturers, vendors, and/or other interested/authorized parties (e.g., government agencies) to better understand both the micro and the macro security threats that are posed by externally connected controllers as well as the current security status (e.g., secure, under attack) of vehicles on the road.

Such features can additionally permit for anomaly detection based prevention, such as through analyzing device measurements (e.g., CPU load, memory usage, I/O usage, etc.) that, by themselves, are not statistically significant, but when analyzed over time can indicate anomalies. For example, taking device measurements over time, average values (e.g., avg. CPU load, avg. memory usage, avg. I/O usage, etc.) can be determined, and when N>x, the standard deviation of the average is so small (e.g., alpha<0.00001) that it can serve as a base line for anomaly prevention and not just detection—meaning it can be accurate enough to block anomalies before/while they are occurring instead of after they have occurred.

In another example, endpoint controller security can permit detection that is much earlier than network-based solutions, which often are not able to detect that malware has compromised a controller until after the malware has had a chance to run. In contrast, endpoint security detects the malware before it has a chance to run on a controller, which not only prevents the malware from ever being executed but also determines that an operation is malware before it has been executed.

In a further example, endpoint security can readily be retrofitted for existing externally connected controllers that were not originally designed or manufactured with endpoint security in mind. This is possible through the automatic security policy generation features described above, which allow for security policies to be generated and readily deployed for controllers with little effort from manufacturers/vendors, and allow for endpoint security to be added to controllers through simple controller updates. Retrofitting can enhance security versions for existing vehicles on the road today, regardless of whether they were originally designed to include endpoint security.

In another example, rather than looking for hackers that are already in an IoT device/system's internal network (e.g., CAN Bus, internally-facing controllers), the disclosed technology can detect and stop an attack from getting into the internal network (e.g., CAN Bus, other controllers) in the first place. For example, the disclosed end-point solution can provide an early intrusion detection system that can protect externally connected controllers, which can allow for early intrusion detection and identification of threats targeting the IoT device/system and blocking exploits from infiltrating its internal components, which can ensure device/system and/or user safety.

Additional and/or alternative advantages are also possible, as described below.

BRIEF DESCRIPTION OF THE ATTACHMENTS

Like reference numbers and designations in the various drawings indicate like elements.

DETAILED DESCRIPTION

Figure 1A:
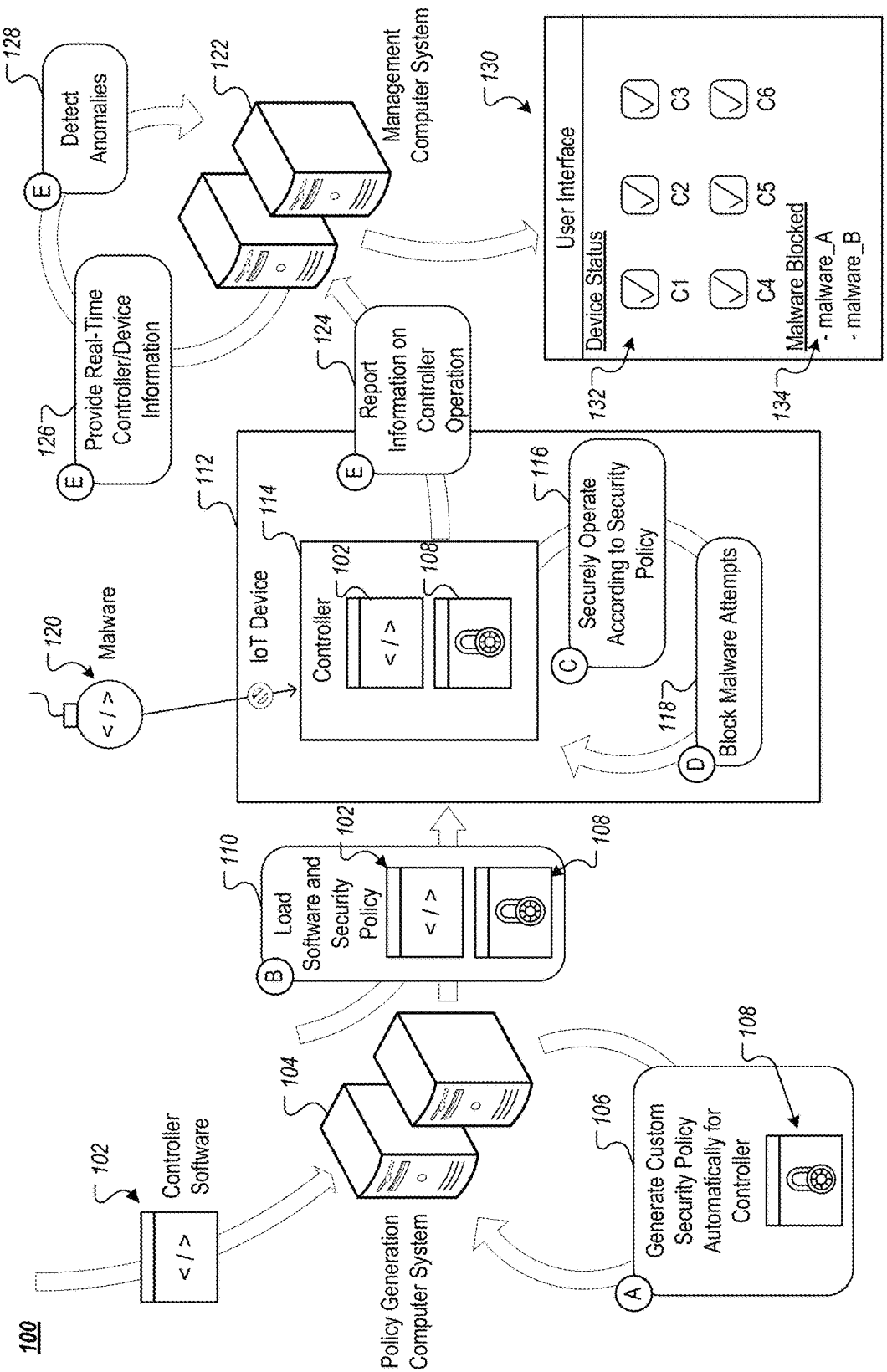
FIG. 1A is a conceptual diagram of an example system for generating and implementing a custom security policy on an example controller.

FIG. 1A is a conceptual diagram of an example system 100 for generating and implementing a custom security policy on an example controller. The example system 100 includes a policy generation computer system 104 (e.g., computer server system, cloud computing system, client computing device) that is programmed to automatically generate a custom security policy for a controller, an example IoT device 112 (e.g., ECU) that includes an example controller 114 that will use the generated security policy to operate securely and to prevent malware, and a management computer system 122 (e.g., computer server system, cloud computing system, client computing device) that is programmed to receive real-time controller information, to detect anomalous controller behavior, and to provide an interface for users to view real-time controller/device status information. Although not depicted, the system 104, the IoT device 112, and the system 122 can communicate over one or more communication networks, such as the internet, local area networks (LAN), wide area networks (WAN), virtual private networks (VPN), wired networks, wireless networks, mobile data networks, or any combination thereof.

The policy generation computer system 104 can receive controller software 102, which can include an operating system and/or applications that are to be run on a controller. The controller software 102 can include binary code, for example, which can be disassembled (e.g., by the policy generation computer system 104) prior to being analyzed to generate a custom security policy. The policy generation computer system 104 can use the controller software to automatically generate a custom security policy 108 for the controller that is to execute the software 102, as indicated by step A (106). For example, the computer system 104 can analyze the software 102 to determine a set of operations and behaviors that are expected during operation of a controller according to the software 102, and can incorporate those operations and behaviors into the custom security policy 108, which may include one or more whitelists of permitted operations and/or behaviors. Generating the security policy can additionally include generating one or more signatures for components of the controller software 102, such as processes/functions that are part of the software 102, that can be used to verify that the code being executed as part of the software 102 is authentic and has not been modified/altered/replaced by malware. By automatically generating a security policy 108 from the controller software 102—meaning without needing manual design for implementation/generation—the system 100 can reduce the burden, cost, and time to generate and implement security layers on controllers, which can increase controller security.

The policy generation can be performed by the computer system 104 in a way that does not necessitate any sort of modification to the controller software 102. For example, the custom policy 108 can be separate from and not rely on modification of the software 102 in order to operate. By generating and implementing the security policy 108 without having to modify or alter the controller software 102, the system 100 can additionally reduce the burden on security layer implementation, which can increase security layer implementation and overall controller security. For example, if the controller software 102 were to be modified in significant ways in order to incorporate the security policy 108, the software 102 would need to be verified and tested again after the security policy 108 has been integrated into the system, which can slow time to deployment and can delay the incorporation of security layers on controllers.

The computer system 104 (and/or other computer systems, such as original equipment manufacturers (OEM)) can load the software 102 and the security policy 108 for the controller 114 of the IoT device 112, as indicated by step B (110). For example, the controller software 102 and the security policy 108 can be flashed onto the controller 114.

The controller 114 can securely operate using the controller software 102, which is confined to operating within the confines of the security policy 108, as indicated by step C (116). For example, the security policy 108 can include whitelists (and other information) that designate authorized behaviors and operations for the controller 114 that are within expected behavior according to the controller software 102. Behaviors/operations that deviate from those authorized behaviors/operations can be prevented from occurring based on the security policy 108 hardening the controller 114 against such behaviors/operations.

For example, the controller software 102 can include one or more portions of code that make the controller 114 unsecure, which can potentially affect the security of not only the controller 114 but the device 112 (and other devices to which it is connected). As described above, security vulnerabilities can come in any of a variety of different types, such as buffer overrun vulnerabilities through which a hacker could potentially modify the software stack to cause malware 120 to be loaded onto and executed by the controller 114. By operating according the security policy 108 on the controller 114, such malware attempts can be blocked before the malware 120 is loaded/executed by the controller 114, as indicated by step D (118).

Such hardening of the controller 114—meaning restriction of the controller 114 to specific behaviors/operations outlined in the security policy 108—can provide endpoint security that provides an early intrusion detection system with a variety of benefits. For example, it can allow for early intrusion detection and warning of attacks by identifying attack attempts before they are able to install/run the malware 120 on the controller 114. It can also stops attacks at the gate—meaning preventing attacks from making it onto the controller 114 and the device 112 (as opposed to other security solutions that attempt to identify malware once it has already been installed/run on a controller). It can eliminate false positives (incorrect identification of attacks) by restricting operation of the controller 114 to only the code and applications that have explicit permission to run on the controller, which can eliminate potential ambiguity (e.g., either the code is part of the factory settings or not). It can also eliminates risk of the policy 108 becoming security vulnerability itself by being outdated. For instance, by custom generating the security policy 108 to match the current version of the controller software 102, the security policy 108 can continue to harden the controller 114 as the controller software 102 is updated over time. Additionally, this is in contrast to other security policies that may use blacklists seeking to identify and prevent particular malware. Such blacklists may require constant updating and may continually run the risk of being outdated, which can expose the controller 114 to potential vulnerabilities. By using whitelists in the security policy 108 that outline permitted behaviors/operations, the security policy 108 can continue to protect the controller 114 even when new and yet unknown malware attempts are launched against the controller 114 and device 112. Quality checks can also be minimized, which can reduce time for deployment and updates. For example, endpoint security layers can be isolated within the controller 114, so there may not be a need to rest the operation of the entire device 112 (or other devices connected to the device 112) as part of the security layer deployment.

The controller 114 can log information about its operation, including blocked malware attempts as well as information on secure operation of the controller 114 over time. Traces of blocked malware attempts can include a variety of information, such as the malware itself, the origin of the malware (e.g., IP address from which the malware originated), and information identifying the code segment that provided the malware exploit. The controller 114 report information on controller operation, as indicated by step E (124). Such reporting can be provided in real-time. For example, the controller 114 can report malware traces in response to the malware 120 is attempt being blocked. The controller 114 can balance reporting with controller performance against the timeliness of reporting for less critical information, such as information about secure operation of the controller 114 during periods of time when no malware attacks were attempted/blocked. For instance, such reports can be delayed until periods of time when the controller 114 and/or the device 112 have at least a sufficient amount of processing capacity and/or network bandwidth available.

The management computer system 122 can receive reports from the controller 114 as well as from multiple other controllers and devices, and can aggregate the reports into a central database system. The reports can be used to provide real-time controller/device information, as indicated by step E (126). For example, the computer system 122 can transmit real-time information that is presented on client computing devices (e.g., mobile computing devices, laptops, desktop computers) in user interfaces, such as the example user interface 130 that includes status information 132 for example controllers C1-C6 and malware information 134 that identifies particular malware that has been blocked by these controllers. The real-time information can be at any of various levels of granularity, such as a device-level (status information for a specific device) and/or a population-level (status information across multiple devices/systems).

The computer system 122 can additionally use the information reported by controllers to detect anomalies, as indicated by step E (128). For example, the computer system 122 can use statistical analysis to identify operation/behaviors that are outside of the normal operation of a controller, such as identifying a sequence of function calls that are a statistical outlier outside of the normal operation of a controller.

Figure 1B:
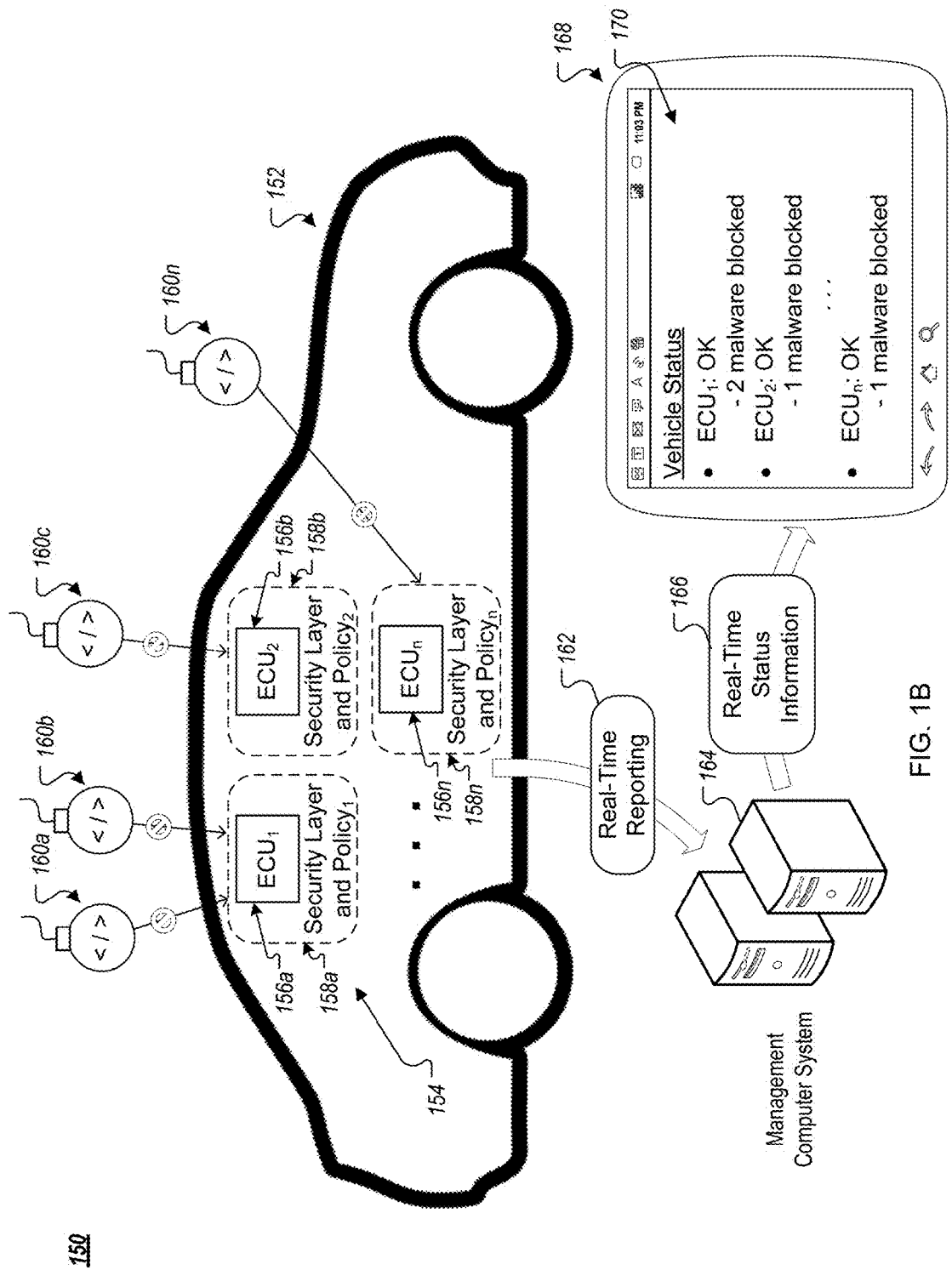
FIG. 1B is a conceptual diagram of an example system for implementing generating and implementing custom security policies on example ECUs that are part of an example vehicle.

FIG. 1B is a conceptual diagram of an example system 150 for implementing generating and implementing custom security policies on example ECUs that are part of an example vehicle 152. The example system 150 is an example implementation of the system 100 to a specific IoT context, which in this example is the vehicle 152. The system 100 and the system 150 can be implemented in a variety of other IoT contexts.

In this example, the vehicle 152 includes a control system 154 that includes multiple ECUs 156a-n that each have their own custom security policy 158a-n. Although not depicted, the security policies 158a-n can be generated in a similar manner described above with regard to FIG. 1A and the policy generation computer system 104. The security policies 158a-n can harden the ECUs 156a-n and can effectively block malware attempts 160a-n, which can be attempts by hackers to find a way into the CAN Bus of the vehicle 152. While the vehicle 152 can include over a hundred ECUs connected to the CAN Bus, only a few may be open externally (accessible to external networks outside of the vehicle 152, such as the internet). These external ECUs (e.g., ECUs 156a-n) can be the gateways into the car and the security policies 158a-n can stop attackers at these gateways, which can significantly reduce, if not eliminate, the risk of attacks penetrating the car's network, which can disrupt the car's operation.

For example, the security policies 158a-n can include whitelists for permitted program binaries, processes, scripts, network behavior, and/or other devices, and can be embedded within the ECUs 156a-n to ensure only explicitly allowed code and behavior may run on it. By using the security policies 158a-n that are specific to the ECUs 156a-n, any processes or functions that are outside of the ECUs permitted/designed operating behavior can be immediately detected and stopped from running on the ECUs 156a-n. This can allow for the ECUs 156a-n to stop malicious code from ever being executed by and possibly taking control of an ECUs' operation.

For instance, hackers targeting the vehicle 152 can use a "dropper," which is a small piece of code or operation, to try to exploit a vulnerability and implant the malware 160a-n. The malware 160a-n is the code that ultimately tampers with or takes control of the function of the vehicle 152, which can cause significant damage and put the safety of the driver and others on the road at risk. By adding an endpoint security layers and policies 158a-n to ECUs 156a-n so that they use policies outlining whitelists of permitted processes, binaries, etc., the ECUs 156a-n are able to provide an early intrusion detection system capable of early detection of unexpected behavior or operation of a dropper (example intrusions) and immediately report on the attack attempt in real-time, as indicated by step 162. The early intrusion detection and warning can give the original equipment manufacturers (OEMs) and system providers of the vehicle 152 (and its subparts) time to address the threat, as indicated by the computer system 164 providing real-time status information to a client computing device 168 with information 170 on malware that has been blocked across the ECUs 156a-n (step 166). For example, an alert on the malware 160a-n can include the complete trail of the attack on the ECUs 156a-n, including its source and path, so vulnerabilities can be fixed and blocked to prevent any malware from infiltrating the CAN Bus on the vehicle 152.

Dropper and other hacker attempts to introduce the malware 160a-n on the externally connected ECUs 156a-n can be detected by the endpoint security layers and policies 158a-n as foreign code and can be blocked when they attempts to run. For instance, such droppers and other hacker attempts are not part of the factory settings for the ECUs 156a-n, so they can be blocked from running by the security layers and policies 158a-n, which can stop them from running and prevent them from doing anything to disrupt the safe operation of the vehicle 152. If a dropper does succeed in dropping the malware 160a-n onto the externally connected ECUs 156a-n, when the malware 160a-n attempt to run on the ECUs 156a-n, the endpoint security layer and policies 158a-n can detect it as foreign code and block its attempts to run.

Endpoint security layers (e.g., security policy 108, security layer and policies 158a-n) can be implemented on newly deployed controllers and can be retrofitted on previously released controllers that may not have previously included security layers. Such retrofitting can improve the security of devices already in use and can be added as part of regular software updates that drivers receive during regular maintenance and updating. Once retrofitted, previously deployed controllers can be protected with endpoint security will be hardened against the cyber threats targeting them.

Figure 2:
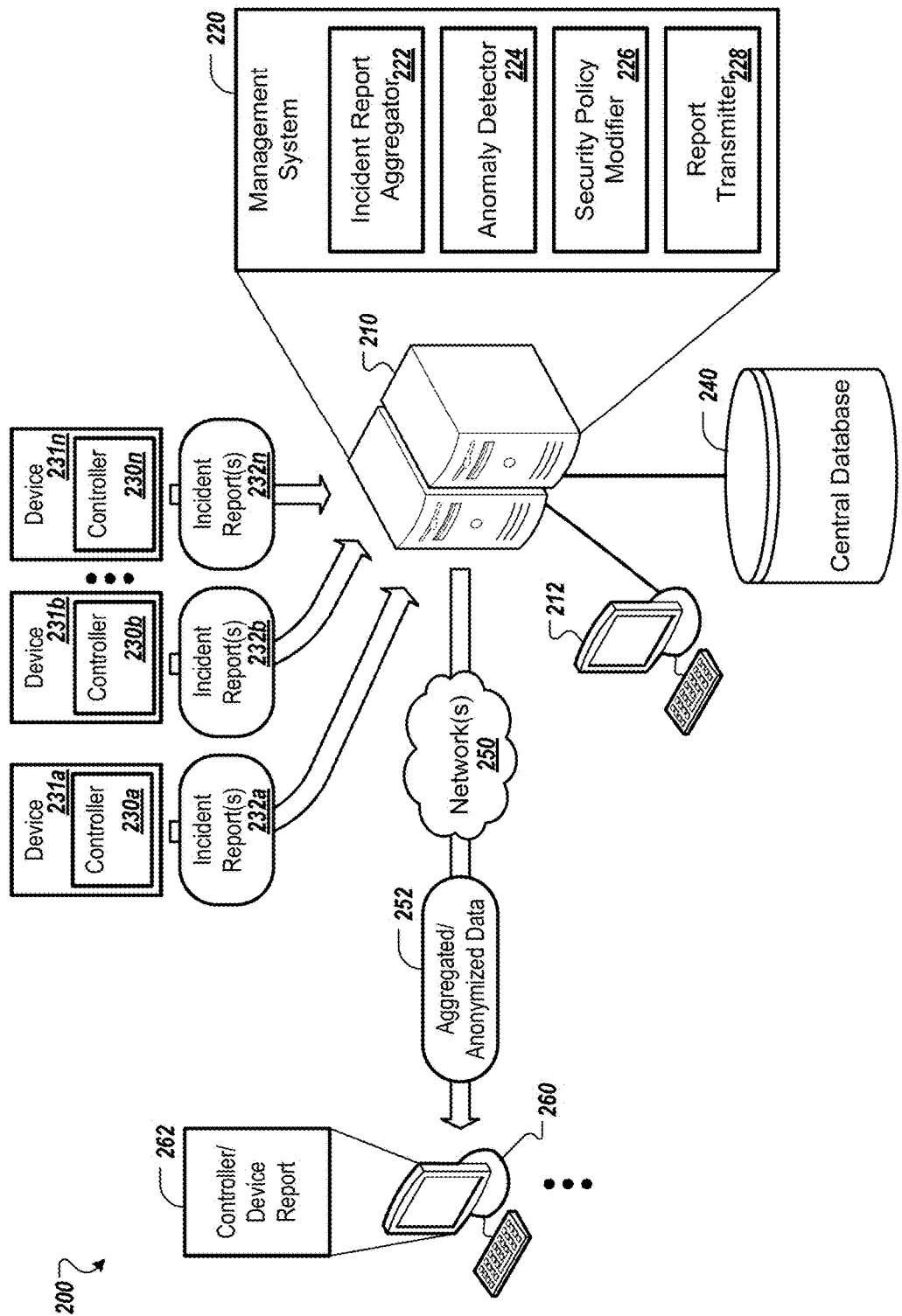
FIG. 2 is a diagram of an example system for detecting and reporting anomalies across a population of controllers

FIG. 2 is a diagram of an example system 200 for centrally managing a population of controllers and detecting controller anomalies. The example system 200 can be similar to the systems 122 and 164 described above with regard to FIGS. 1A-B.

The system 200 can aggregate operation information, including reports of blocked malware and operational logs, from multiple controllers and devices into a central database, and can use the information to provide real-time reports on device and controller security status. Real-time reports can include, for example, current status information across a population of controllers and devices/systems, including forensic information identify of malware attacks and the security vulnerabilities in controller code that the malware was attempting to exploit.

The system 200 can also use the aggregated operational information to detect anomalies in controller and device performance, which can be used to update security policies. For example, a particular sequence of functions may permitted under a custom security policy for a particular controller, but may only occur infrequently and during times when malware attacks are being blocked. Accordingly, the system 200 can determine that such a particular sequence may be an anomaly that is a possible exploit to be used by hackers, and can be removed from a process map providing approved/validated sequences of processes that are used as part of a custom security policy.

As shown in FIG. 2, the example system 200 includes a management system 220. The management system 220, for example, can be implemented using one or more computer servers(s) 210. In some examples, the computing server(s) 210 can represent various forms of servers, including, but not limited to a network server, a web server, an application server, or a server farm. The computing server(s) 210 may be configured to execute application code associated with a variety of software components (e.g., modules, objects, libraries, services, etc.) and/or hardware components, including an incident report aggregator 222, an anomaly detector 224, a security policy modifier 226, and a report transmitter 228. Two or more of the components 222, 224, 226, and 228 may be implemented on the same computing device, or on different devices, such as devices included in a computer network, a peer-to-peer network, or on a special purpose computer or special purpose processor. Operations performed by each of the components 222, 224, 226, and 228 may be performed by a single computing device, or may be distributed to multiple devices.

The example system 200 can include one or more computing device(s) (e.g., computing devices 212 and 262) employed by users for sending data to and receiving data from the security policy generation system 220. The computing devices 212 and 262, for example, may be any suitable type of computing device (e.g., laptop or desktop computer, tablet computer, smartphone, personal digital assistant, or other stationary or portable device). Among other components, the computing devices 212 and 262 can include one or more processors, computer readable media that store software applications, input device(s) (e.g., touch screens, keyboards, computer mice, motion sensors, microphones, etc.), output device(s) (e.g., display screens, speakers, etc.), and communications interfaces.

Various data sources (e.g., databases, file systems, etc.) may maintain data used by the example system 200 and its components. For example, the system 200 includes a central database 240 that can include aggregated controller/device information. The central database 240, for example, can implement databases, file systems, and the like to add, remove, and maintain data used by the system 200.

The computing server(s) 210, the computing devices 212 and 262, and the central database 240 included in the example system 200 can communicate over one or more networks 250. The network(s) 250 may include a local area network (LAN), a WiFi network, a mobile telecommunications network, an intranet, the Internet, or any other suitable network or any appropriate combination thereof.

The system 200 can include a plurality of controllers 230a-n that, in this example, are spread across a plurality of devices 231a-n (devices/systems may each include more than one controller). The controllers 230a-n can transmit incident reports 232a-n to the computer system 210, such as reports of malware attempts blocked, operational logs (e.g., operations performed on the controllers 230a-n, resource usage information at various times during controller operation), alerts regarding possible security risks (e.g., alerts regarding potential tampering with custom security layers on the controllers 230a-n), and/or other appropriate information. The incident report aggregator 222 of the computer system 210 can receive and aggregate the information in a central database 240 (e.g., cloud data storage system). The incident report aggregator 222 can anonymize the data stored in the central database 240 so that it is able to provide relevant and usable information for addressing specific security threats without revealing personally identifying information for users associated with the devices 231a-n.

In addition to storing reports, logs, and other information, the computer system 210 can maintain malware code that has been blocked on the controllers 230a-n in the central database 240. The computer system 210 and the central database 240 can take additional precautions to ensure that the malware code is segregated from any code for generating or inclusion in security policies. The computer system 210 can analyze malware code samples to identify operating system vulnerabilities on controllers and can provide malware samples to manufacturers/developers to better understand and patch these vulnerabilities.

The incident report aggregator 222 can additionally be programmed to identify malware threats and code vulnerabilities across population of similar devices 231a-n and/or controllers 230a-n. For example, the report aggregator 222 can be programmed to identify trends, such as particular malware attack attempts (based on identification of similar malware code samples from the central database 240) and particular controllers that include software bugs providing potential exploits. The report aggregator 222 can, for instance, identify that a particular controller is vulnerable to a particular attack, but that other controllers are not susceptible to such an attack (i.e., other controllers do not include software bug providing potential exploit).

The computer system 210 includes an anomaly detector 224 that is programmed to detect anomalies and improve security policy across population of similar devices 231a-n and/or controllers 230a-n. For example, the anomaly detector 224 can detect anomalies in controller performance and operation that, when viewed in isolation may not indicate potential malware vulnerabilities, but when viewed across a population of similar controllers can indicate anomalous behavior that is an indicator of a potential security threat. The anomaly detector 224 can use statistical analysis on the data contained within the central database 240 to identify statistical outliers in controller performance, and can provide those outliers to a security policy modifier 226, which can compare those outliers against controller security policies to identify modifications to prohibit (carve out) the anomalous behavior. For instance, a particular controller security policy may permit function A to call function X to call function C. However, such a sequence of function calls may be performed infrequently and, when coupled with blocked malware attacks (before, during, or after the sequence of functions calls), can indicate that such a sequence is a malware vulnerability and should be removed from the security policy (removed from the function mapping for the controller). The security policy modifier 226 can be programmed to modify corresponding security policies to remove anomalous features from being permitted under the policy, and can cause policy updates to be provided to relevant devices.

The report transmitter 228 can be programmed to generate and transmit reports to computing devices that are associated with manufacturers/developers, such as the computing device 260. The reports can include a variety of information, such the status across a population of devices 231a-n and/or controllers 230a-n, current security attacks, code bugs that are providing attack vulnerabilities, comparison of the population of devices 231a-n and/or controllers 230a-n against other groups of devices/controllers (e.g., other versions of those devices and/or controllers, such as versions provided by other manufacturers). The reports can include real-time information that is conveyed from the controllers 230a-n in real-time to the computer system 210, and relayed to the computing device 260 in real-time. Manufacturers/developers (and other authorized users) of the device 260 can additionally use report interface to drill down into the specifics of particular security vulnerabilities on a controller. Reports 262 can be output in various user interfaces on the computing device 260, such as graphical user interfaces (GUI), such as web browser interfaces, mobile app interfaces, and/or other appropriate interfaces.

Figure 3:
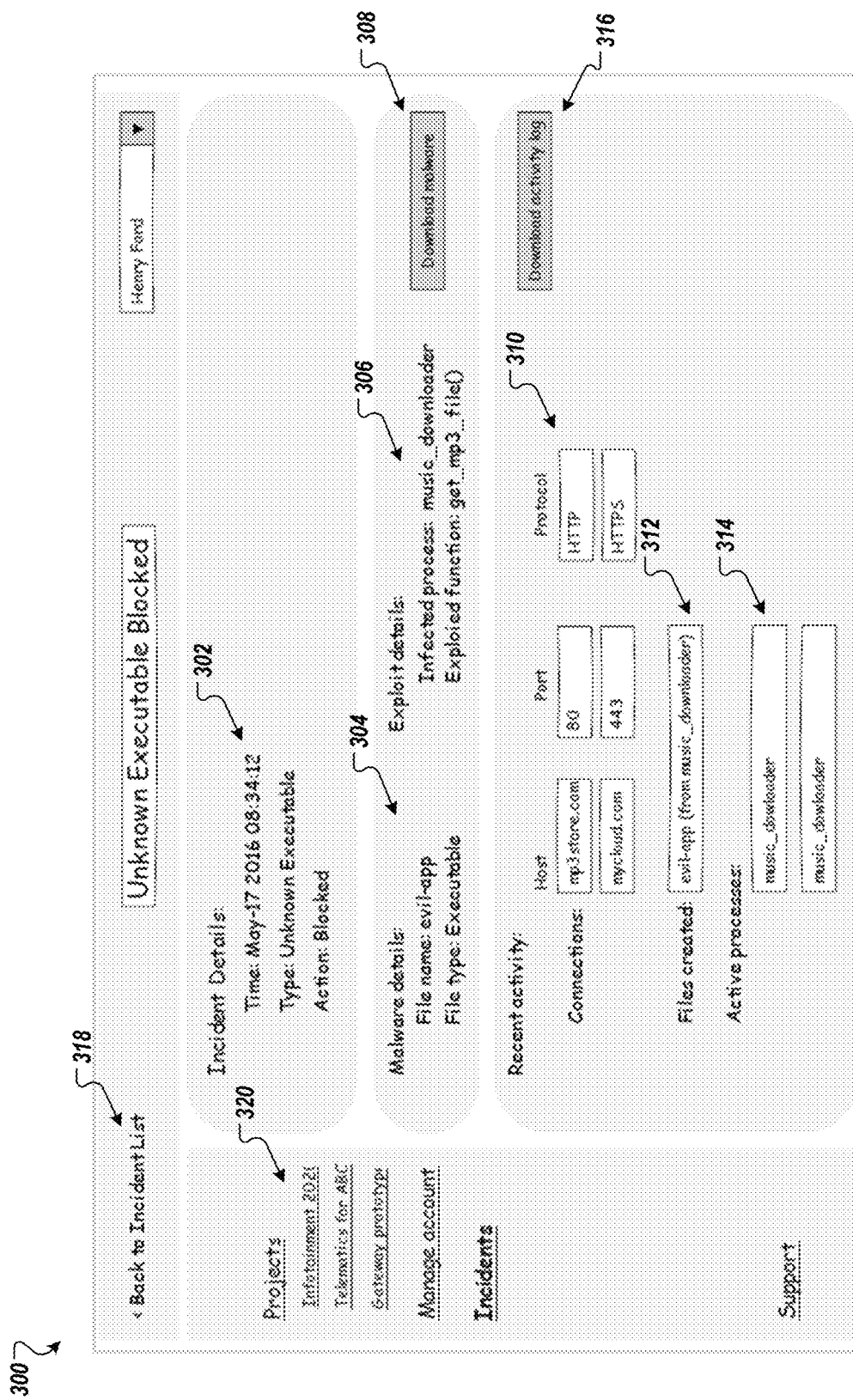
FIG. 3 depicts an example interface for providing an incident report for a controller.

FIG. 3 depicts an example interface 300 for providing an incident report for a controller. Referring to FIG. 2, for example, the example interface 300 can be presented on a client computing device, such as the computing device 212 and/or the computing device 262 and can be used to provide incident report information (e.g., incident report(s) 232a, 232b, and 232c) received from controller/devices (e.g., controller(s) 230a, 230b, and 230c). The information in the interface 300 can be provided by a management computer system, such as the management computer system 122, the management computer system 164, and/or the management computer system 210.

In the present example, the interface 300 includes incident report information for a particular controller, including incident details 302, such as a timestamp when the incident occurred, a type of malware blocked (e.g., executable, script), and actions that was taken by the security layer on the controller (e.g., blocked, restarted controller). The interface 300 can also present malware information 304, such as a name of the malware that was blocked (e.g., malware file name) and a type of file (e.g., executable, script), as well as information on the exploit (security vulnerability) on the controller that was used by the malware in the attack (306), such as a name of the infected/vulnerable process and a specific function that was exploited by the malware. The interface 300 can additionally include a feature 308 through which a user of the interface 300 can download the actual malware that was blocked.

The interface 300 can additionally include a section of information that provides context for the malware attack on the controller, including recent network activity information 310 (e.g., recent network connections with host identifications, transmission protocols, and ports), information on files that have been recently created (312), and information on active processes that are currently running on the controller (314). The interface 300 can also include a feature 316 through which a user can download an activity log for the controller.

The interface 300 can also include features through which other incidents and controllers within a device or system can be viewed (e.g., view information on other controllers and/or incidents within a vehicle), such as a link to view an incident list (318) and links 320 to view other groupings of controller-related information. Other interfaces are also possible, such as the example interfaces 130 and 170 described above with regard to FIGS. 1A-B. Additionally, global/regional views of groups of controllers can also be provided, such as maps, charts, and/or graphs depicting the status, in aggregate, of the same controller installed across a group of devices/systems. Similar views can also be provided on a device/system level based on aggregate views of controller(s) status.

Figure 4:
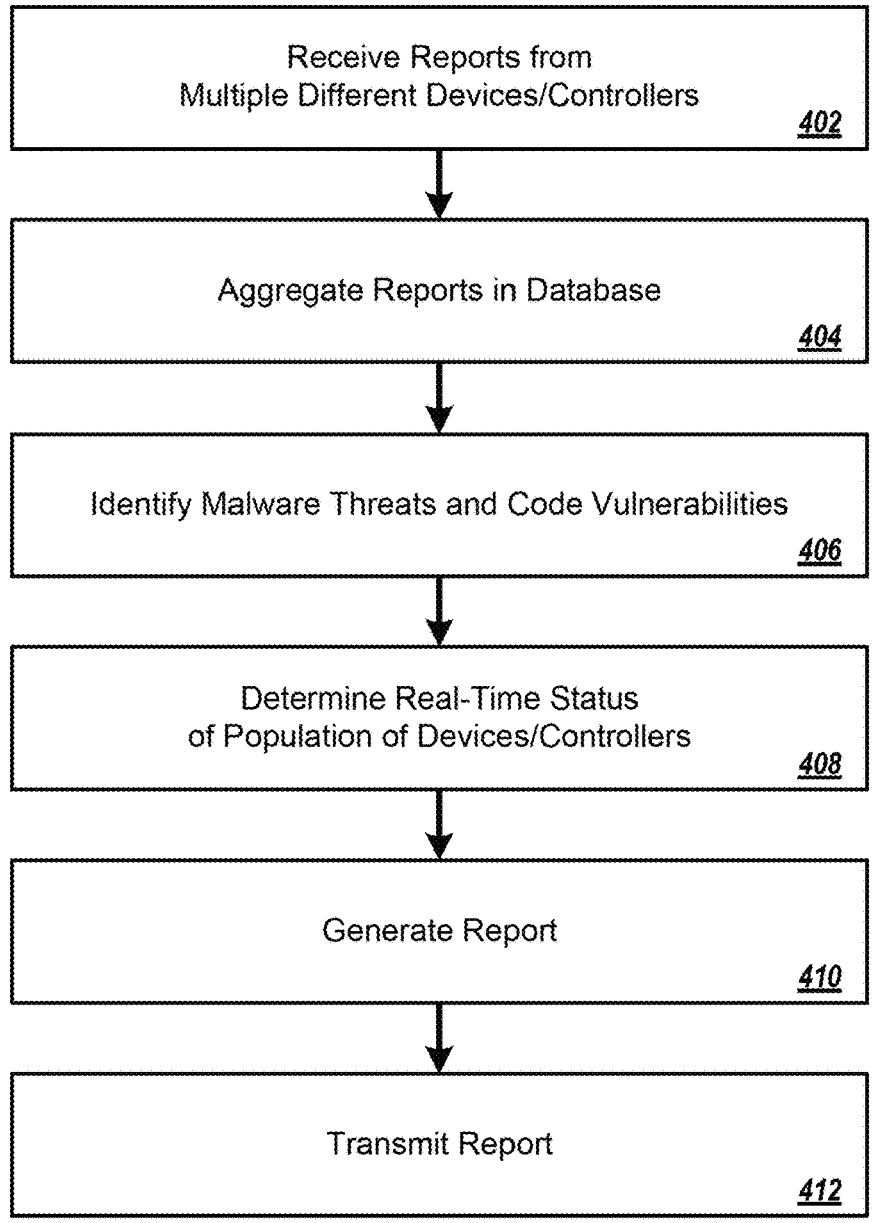
FIG. 4 depicts an example process for generating and transmitting real-time report data for a population of controllers.

FIG. 4 is a flowchart of an example technique 400 for reporting real-time controller information to client computing devices. The example technique 400 can be performed by any of a variety of management computer systems, such as the management computer system 122, the management computer system 164, and/or the management computer system 210.

Reports and other controller information can be received from multiple different devices and controllers (402). The reports and controller information can be aggregated in a central database (404). For example, the computer system 210 can receive reports, logs, and other controller information from the controllers 230a-n, which the computer system 210 can aggregate and organize in the central database in one or more data structures to permit for ready identification of related information and fast recall. For example, the central database 240 may store information in one or more hash tables where hashing is based on one or more parameters that may be relevant to reports, such as identifiers for types of controller and/or devices (to permit for information relevant to a particular type of controller/device to be retrieve quickly). The central database 240 can timestamp reports, logs, and other information received from the controllers 230a-n, and may use techniques to maintain the most recent information in storage locations with faster recall (e.g., flash memory) and can relegate older information to cheaper storage locations with slower recall (e.g., hard drives).

Malware threats and code vulnerabilities on controllers can be identified from the aggregated information (406). For example, for each particular instance in which malware attempts are blocked, information about the particular malware that was blocked can be identified (e.g., file name, type) and code exploits that were used by the malware can be identified (e.g., process, function, process/function version, controller, device/system). Some of this information can be included in malware reports that are received by the computer system 210 from controllers 230a-n, and other portions of the information can be determined from information included in the reports. Suggested code modifications/fixes can be determined, such as through analysis of the malware and the controller code that was the source of the exploit. An example of such information is presented in the interface 300 as information 304-306.

In addition to determining information about a specific blocked malware instance, the computer system 210 can determine a global context for the malware, such as determining a prevalence of the malware attack on other controllers and devices/systems (e.g., frequency of blocked instances over time on the same type of controller or device/system, frequency of blocked instances across other types of controllers or devices/systems). The central database 240 can provide a pool of relevant information make broader determinations about malware outside of a specific instance. The computer system 210 can, for example, generate statistics for a blocked malware instance, such as statistics on which devices/systems and/or controllers are affected, a context when attacks occurred (e.g., network connection, geolocation, operational state), specific code segments that are providing exploits, types of network connections over which the malware is transmitted (e.g., Wi-Fi, BLUETOOTH, cellular networks), and/or IP addresses/geolocations from which attacks originate. Additionally, the computer system 210 can determine connections and relationships between different malwares, such as through comparing code segments and/or functional operations that are included in malware obtained through reports. Such relationships can additionally be used to provide a global context for a malware attack. Such global information can additionally be provided in an interface, such as the interface 300.

Real-time status for a population of devices/systems and/or controllers can be determined (408). For example, the same controller may be installed on many devices/systems. The computer system 210 can generate an aggregate view of the status of controllers in this population through accessing information contained in the central database 240. Status information can include, for instance, a ratio of the number of controllers and/or devices/systems that are under attack versus those not under attack.

Reports can be generated (410). For example, the computer system 210 can generate reports that include one or more portions of the information described above with regard to steps 402-408. For instance, a report can include real-time information on malware threats and code vulnerabilities, including identification of the malware attack, information on the malware attack, identification of the code vulnerability and suggested fixes, a copy of the malware, global malware information, and real-time population information for the controller and/or device/system that experienced the attack. An example report is depicted in FIG. 3. The generated report can be transmitted to a client device for presentation (412).

Figure 5:
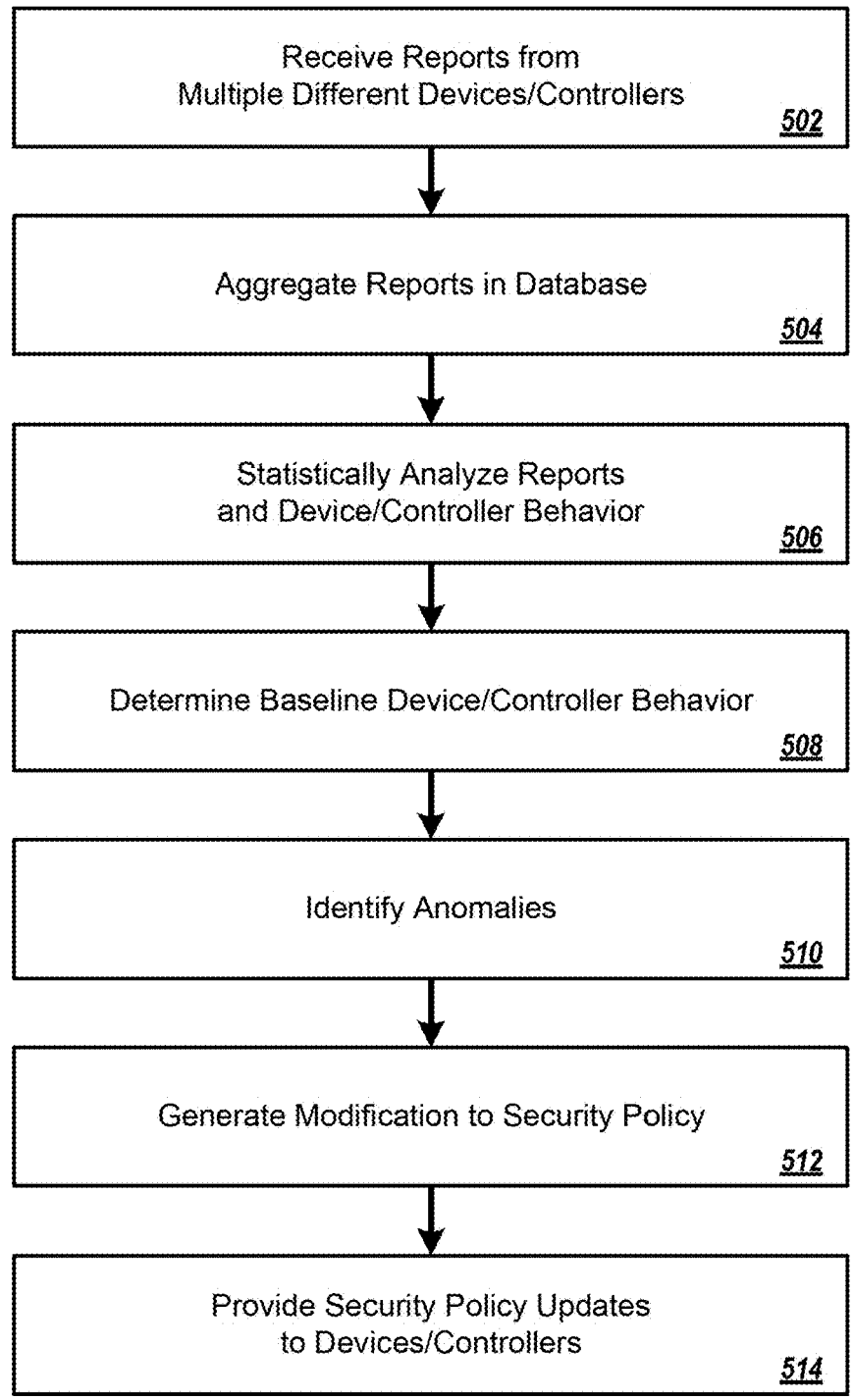
FIG. 5 depicts an example process for detecting anomalies across a population of controllers.

FIG. 5 is a flowchart of an example technique 500 for detecting anomalies in controller operation that may indicate malware attacks. The example technique 500 can be performed by any of a variety of management computer systems, such as the management computer system 122, the management computer system 164, and/or the management computer system 210.

Report, logs, and other controller information from multiple different devices and/or controllers can be received (502) and aggregated into a central database (504). Statistical analysis can be performed on the aggregated information (506) and can be used to determine baseline device/system and/or controller behavior (508). For example, the computer system 210 can use the anomaly detector 224 to identify baseline behavior for particular controller types, device/system types, and/or combinations of the two across one or more facets, such as process/function sequences, network packet (e.g., IP address, port, payload), process/function call frequency, device/system context (e.g., operational state, geolocation, network connection type), and/or resource usage (e.g., CPU usage, memory allocations). From these baselines, anomalies can be identified (510). For example, the computer system 210 can identify behavior that deviates from the baseline by at least a threshold statistical deviation (e.g., two or more standard deviations). From the identified anomalies, modifications to the security policy can be generated (512). For example, the computer system 210 can use the security policy modifier 226 to modify whitelists that are part of the security policy for a controller to remove portions of the whitelist that permit the anomalous behavior. Security policy updates can be pushed out to devices/systems with controllers using the security policy (514).

Figure 6:
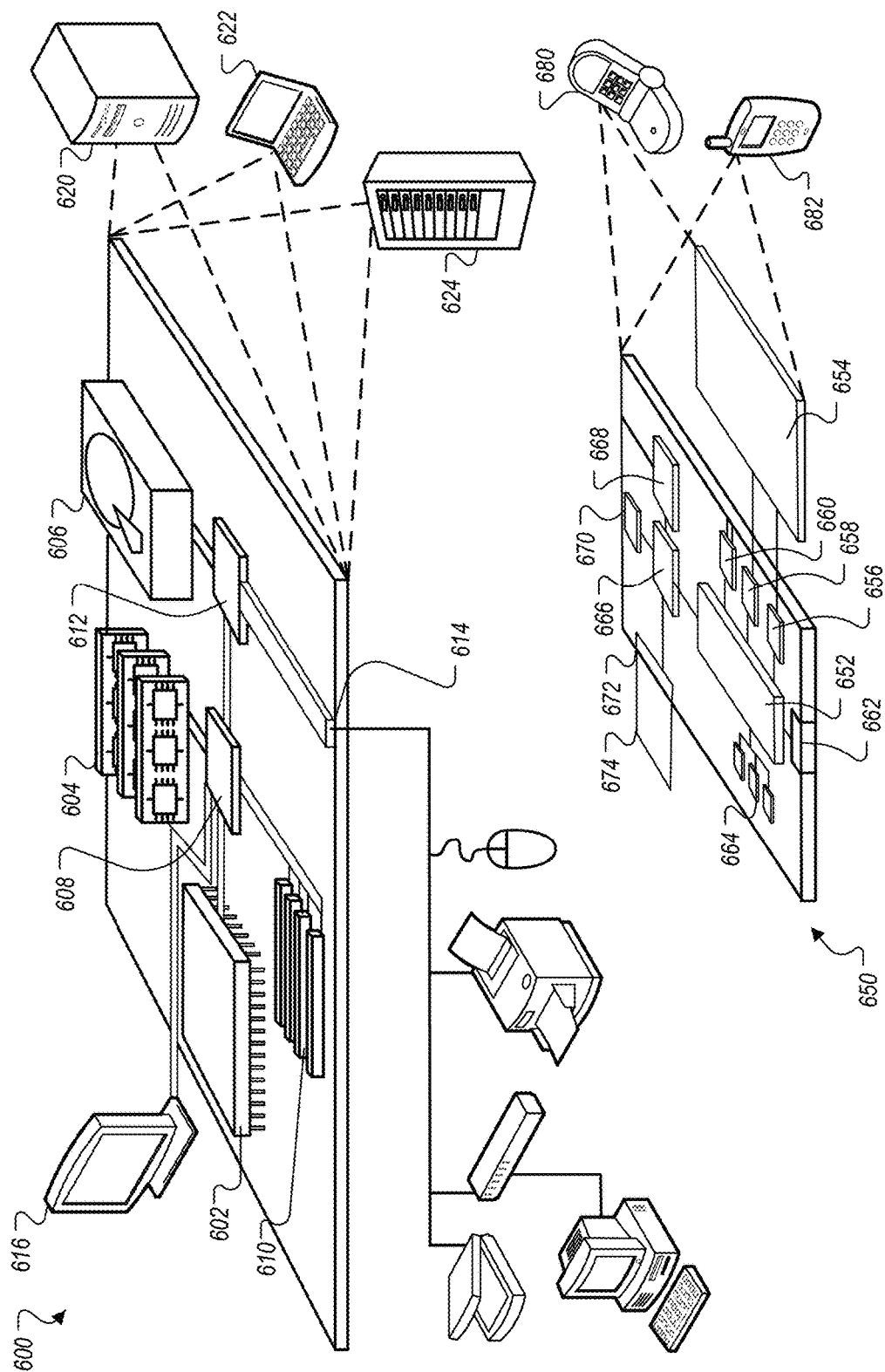
FIG. 6 is a block diagram of example computing devices.

FIG. 6 is a block diagram of example computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 600 is further intended to represent any other typically non-mobile devices, such as televisions or other electronic devices with one or more processers embedded therein or attached thereto. Computing device 650 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 600 includes a processor 602, memory 604, a storage device 606, a high-speed controller 608 connecting to memory 604 and high-speed expansion ports 610, and a low-speed controller 612 connecting to low-speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed controller 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low-speed controller 612 manages lower bandwidth-intensive operations. Such allocation of duties is an example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed bus 614. The low-speed bus 614 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as computing device 650. Each of such devices may contain one or more of computing devices 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The computing device 650 may also be provided with a storage device, such as a micro-drive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the computing device 650, such as control of user interfaces, applications run by computing device 650, and wireless communication by computing device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of computing device 650 with other devices.

External interface 662 may provide, for example, for wired communication (e.g., via a docking procedure) or for wireless communication (e.g., via Bluetooth® or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to computing device 650 through expansion interface 672, which may include, for example, a subscriber identification module (SIM) card interface. Such expansion memory 674 may provide extra storage space for computing device 650, or may also store applications or other information for computing device 650. Specifically, expansion memory 674 may include instructions to carry out or supplement the processes described above, and may include secure information also. Thus, for example, expansion memory 674 may be provide as a security module for computing device 650, and may be programmed with instructions that permit secure use of computing device 650. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Computing device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 668 (e.g., a radio-frequency transceiver). In addition, short-range communication may occur, such as using a Bluetooth®, WiFi, or other such transceiver (not shown). In addition, GPS receiver module 670 may provide additional wireless data to computing device 650, which may be used as appropriate by applications running on computing device 650.

Computing device 650 may also communicate audibly using audio codec 660, which may receive spoken information from a user and convert it to usable digital information. Audio codec 660 may likewise generate audible sound for a user, such as through a speaker, e.g., in a handset of computing device 650. Such sound may include sound from voice telephone calls, may include recorded sound (e.g., voice messages, music files, etc.) and may also include sound generated by applications operating on computing device 650.

The computing device 650 may be implemented in a number of different forms, as shown in the figure. For example, it may be implemented as a cellular telephone 680. It may also be implemented as part of a smartphone 682, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A system for providing security on externally connected electronic control units (ECUs) of automobiles, the system comprising:
   a processor and computer-readable memory, the computer-readable memory comprising instructions that, when executed by the processor, cause the processor to perform operations comprising:
      receiving, at a server system, operation information for a plurality of instances of an ECU, the plurality of instances being installed across a plurality of devices, and the operation information comprising malware reports that identify malware on the plurality of instances of the ECU;
      statistically analyzing, by the server system, the received operation information, wherein the statistically analyzing comprises identifying an operation from the received operation information that is outside of determined normal operations of the ECU, wherein the determined normal operations include a baseline of frequencies of function call sequences performed by the ECU;
      identifying, by the server system, one or more anomalous ECU behaviors based on the statistical analysis; and
      providing, by the server system, information regarding the one or more anomalous ECU behaviors on the ECU as a potential security threat.

2. The system of claim 1, further comprising:
   updating, by the server system, one or more security policies to exclude performance of the one or more anomalous ECU behaviors in response to the information; and
   pushing out the updated one or more security policies to the plurality of devices.

3. The system of claim 2, wherein the plurality of instances of the ECU block the one or more anomalous ECU behaviors from being performed on the ECU using the updated one or more security policies.

4. The system of claim 3, wherein:
   the plurality of instances of the ECU include a security middleware layer that is incorporated into operating systems on the plurality of instances of the ECU, and
   the security middleware layer is positioned to restrict one or more kernel processes of the operating systems to operations that are permitted according to the updated one or more security policies.

5. The system of claim 4, wherein:
   updating the one or more security policies comprises removing information corresponding to the one or more anomalous ECU behaviors from one or more whitelists that are part of the one or more security policies, and
   the one or more whitelists define the operations that are permitted.

6. The system of claim 5, wherein:
   the one or more anomalous ECU behaviors comprise a particular sequence of function calls, and
   the information removed from the one or more whitelists comprises function mappings outlining the particular sequence of function calls.

7. The system of claim 5, wherein:
   the one or more anomalous ECU behaviors comprise receipt or transmission of a particular network packet, and
   the information removed from the one or more whitelists comprises one or more of: an IP address specified in the particular network packet, a network port specified in the particular network packet, and a payload content type for the particular network packet.

8. The system of claim 5, wherein:
   the one or more anomalous ECU behaviors comprise execution of a particular process, and
   the information removed from the one or more whitelists comprises information identifying the particular process.

9. The system of claim 1, wherein the ECU is an automotive ECU and the device is a vehicle.

10. The system of claim 1, wherein the malware reports include copies of the blocked malware.

11. A method for providing security on externally connected electronic control units (ECUs) of automobiles, the method comprising:
   receiving, at a server system, operation information for a plurality of instances of an ECU, the plurality of instances being installed across a plurality of devices, and the operation information comprising malware reports that identify malware on the plurality of instances of the ECU;
   statistically analyzing, by the server system, the received operation information, wherein the statistically analyzing comprises identifying an operation from the received operation information that is outside of determined normal operations of the ECU, wherein the determined normal operations include a baseline of frequencies of function call sequences performed by the ECU;
   identifying, by the server system, one or more anomalous ECU behaviors based on the statistical analysis; and
   providing, by the server system, information regarding the one or more anomalous ECU behaviors on the ECU as a potential security threat.

12. The method of claim 11, further comprising:
updating, by the server system, one or more security policies to exclude performance of the one or more anomalous ECU behaviors in response to the information; and
pushing out the updated one or more security policies to the plurality of devices.

13. The method of claim 12, wherein the plurality of instances of the ECU block the one or more anomalous ECU behaviors from being performed on the ECU using the updated one or more security policies.

14. The method of claim 13, wherein:
the plurality of instances of the ECU include a security middleware layer that is incorporated into operating systems on the plurality of instances of the ECU, and
the security middleware layer is positioned to restrict one or more kernel processes of the operating systems to operations that are permitted according to the updated one or more security policies.

15. The method of claim 14, wherein:
updating the one or more security policies comprises removing information corresponding to the one or more anomalous ECU behaviors from one or more whitelists that are part of the one or more security policies, and
the one or more whitelists define the operations that are permitted.

16. The method of claim 15, wherein:
the one or more anomalous ECU behaviors comprise a particular sequence of function calls, and
the information removed from the one or more whitelists comprises function mappings outlining the particular sequence of function calls.

17. The method of claim 15, wherein:
the one or more anomalous ECU behaviors comprise receipt or transmission of a particular network packet, and
the information removed from the one or more whitelists comprises one or more of: an IP address specified in the particular network packet, a network port specified in the particular network packet, and a payload content type for the particular network packet.

18. The method of claim 15, wherein:
the one or more anomalous ECU behaviors comprise execution of a particular process, and
the information removed from the one or more whitelists comprises information identifying the particular process.

19. The method of claim 11, wherein the ECU is an automotive ECU and the device is a vehicle.

20. The method of claim 11, wherein the malware reports include copies of the blocked malware.

21. A method for providing security on externally connected electronic control units (ECUs) of automobiles, the method comprising:
receiving, at a server system, real-time information identifying malware blocked by a security middleware layer running on an ECU that is part of a device, wherein the malware is associated with a deviation from determined normal operations of the ECU, wherein the determined normal operations include a baseline of frequencies of function call sequences performed by the ECU;
aggregating, by the server system, the real-time information with real-time information from other ECUs;
determining, by the server system, aggregate information related to the blocked malware on the ECU;
generating, by the server system, a report that includes information identifying the blocked malware on the ECU and the aggregate information; and
transmitting, by the server system and in real-time, the report to a client computing device for a user who is associated with the ECU.

22. The method of claim 21, wherein:
the real-time information comprises a malware report that identifies the malware, a portion of an operating system on the ECU that was exploited by the malware, and a copy of the malware, and
the report includes information identifying the malware, the exploited portion of the operating system, and the copy of the malware.

23. The method of claim 21, wherein the aggregate information includes information regarding a current status of other instances of the ECU running on other devices.

24. The method of claim 21, wherein the aggregate information includes information regarding other instances of the malware identified on other ECUs.

25. The method of claim 21, wherein the ECU is an automotive ECU and the device is a vehicle.

* * * * *